United States Patent [19]
Rosen et al.

[11] Patent Number: 6,081,264
[45] Date of Patent: Jun. 27, 2000

[54] OPTIMAL FRAME RATE SELECTION USER INTERFACE

[75] Inventors: Andrew D. Rosen, Woodinville; Brian D. Honey, Milton; William J. Heaton; John A. Painter, both of Everett; Philip G. Zack, SeaTac, all of Wash.

[73] Assignee: Microsoft Corporation, Redmond, Wash.

[21] Appl. No.: 09/023,527

[22] Filed: Feb. 13, 1998

[51] Int. Cl.[7] ...................................................... G06T 3/00
[52] U.S. Cl. ............................................. 345/328; 348/700
[58] Field of Search ................................... 345/473, 328, 345/433; 348/700

[56] References Cited

U.S. PATENT DOCUMENTS

5,099,322  3/1992  Gove et al. ............................. 348/700
5,237,648  8/1993  Mills et al. ............................. 345/433

*Primary Examiner*—Mark K. Zimmerman
*Assistant Examiner*—Lance W. Sealey
*Attorney, Agent, or Firm*—Schwegman, Lundberg, Woessner & Kluth, P.A.

[57] ABSTRACT

An optimal frame rate selection user interface is disclosed. In one aspect of the invention, a method has two steps. First, a video clip is displayed within at least one window, to permit dividing the clip into a plurality of shots (where each shot has a plurality of frames). Second, each shot is displayed in at least two windows, to permit selecting a desired frame rate for each shot. Desirably, each of these windows displays a given shot at a different frame rate. Therefore, a user is able to view each shot at a number of different frame rates to determine an optimal frame rate for each shot.

41 Claims, 7 Drawing Sheets

OPTIMAL FRAME RATE SELECTION USER INTERFACE

FIELD OF THE INVENTION

This invention relates generally to frame rate selection for digitally compressed video clips, and more particularly to a user interface for such frame rate selection.

BACKGROUND OF THE INVENTION

With the advent and increasingly popularity of compact-disc read-only-memory (CD-ROM) technology and usage of the Internet, the viewing of digitally compressed video clips on personal computers (PC's) has also become very popular. For example, with respect to CD-ROM technology, a popular CD-ROM application is the encyclopedia, such as Microsoft's Encarta encyclopedia. A user is able to look up topics of interest, and for many such topics, can view a short video clip on a computer monitor. With respect to the Internet, many world-wide-web sites now include video clips, that can be instantly downloaded and viewed on a monitor.

Unlike other manners by which video may be viewed, such as film, television, video tape, and digital video disc (DVD), compression of source video into a relatively small file is important in CD-ROM and Internet applications (as well as in other applications). A CD-ROM typically only stores 650 megabytes of data, as compared to a DVD, for example, that may store four or five times this amount.

While streaming video applications on Internet web sites are generally not limited by storage capacity, they are limited by throughput: the typical consumer accesses the Internet via a 28.8K, 33.6K, or 56K baud modem. At this relatively slow data transfer rates (for example, the typical office environment local-area network (LAN) may offer transfer rates that are one hundred to one thousand times faster), the digitally compressed video clip must be able to be transferred quickly from the host web site to the consumer's computer, in order for the video to be optimally viewed.

Therefore, the computer industry has first turned to video compression algorithms in order to decode source video into relatively small digitally compressed video clips. For example, one common standard is the MPEG standard, developed by the Moving Picture Experts Group. The MPEG standard is available in different versions, such as MPEG-1, MPEG-2 and MPEG-4, where a higher number typically denotes a more robust and lenient compression algorithm. The MPEG standard is described in Roy Hoffman, *Data Compression in Digital Systems*, pages 113–119 (1997), which is hereby incorporated by referenced.

In the MPEG standard, as well as in other standards, a primary consideration is the "frame rate," or number of frames displayed per second, within the digitally compressed video clip. Generally, the higher the frame rate, the better the quality of the resulting video clip. Each frame within the clip may be an actual frame from the source video (digitally processed), or may be a blend of two or more frames from the source video. Furthermore, allowed in the MPEG-1, MPEG-2 and MPEG-4 standards, as well as in other standards, is the division of the video clip into two or more group of pictures (GOP's), or "shots," each shot including a number of frames of the clip. The division of the clip into shots permits each shot to have a different frame rate. This is desirable, because certain parts of the video clip may be displayed optimally with a lower frame rate than other parts (and thereby decreasing the overall size of the clip). This is true because parts of the video clip that show less motion than other parts generally do not need as high a frame rate.

While in theory the division of a video clip into a number of shots, each shot having a number of frames, is potentially desirable, it presents a difficulty in terms of efficient decoding of source video into such a video clip.

That is, dividing the video clip into shots, and further setting a different frame rate for each shot, is difficult to accomplish in conjunction with prior art technology. Specifically, except for the most highly experienced video processing professional, the decision as to the optimal frame rate to select for each shot within a video clip is a difficult one. There is a need, therefore, to ease such video processing. That is, there is a need to ease the division of a video clip, as decoded from a source video, into a number of shots, and further to ease the selection of a frame rate for each shot.

SUMMARY OF THE INVENTION

The above-mentioned shortcomings, disadvantages and problems are addressed by the present invention, which will be understood by reading and studying the following specification. One aspect of the invention is a method having two steps. First, a video clip is displayed within at least one window, to permit dividing the clip into a plurality of shots (where each shot has a plurality of frames). Second, each shot is displayed in at least two windows, to permit selecting a desired frame rate for each shot. Desirably, each of these windows displays a given shot at a different frame rate.

Thus, a user is first able to view the video clip in at least one window, and divide the clip into temporally sequential shots, such as by initiating an input event (e.g., clicking a mouse button, or pressing a key on a keyboard). Then, the user is able to view each shot within at least two windows, where desirably each of these windows displays the shot at a different frame rate, to determine the optimal frame rate for each shot. For example, a shot may be displayed in each of these windows over and over in an endless loop, until the user decides on which frame rate to use for that shot. This may be also accomplished by initiating an input event, such as positioning a pointer over the window having the desired frame rate, and clicking a mouse button. In this manner, the user is able to continuously view each shot at a number of different frame rates, to determine the lowest frame rate at which the shot is optimally viewed.

The present invention includes computerized methods, systems, computers, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 2(*a*) shows a diagram representing a video clip that has be digitally compressed from source video, and in conjunction with which embodiments of the invention may be used;

FIG. 2(*b*) shows a flowchart of a computerized method according to one embodiment of the invention;

FIG. 2(*c*) shows a diagram of a computerized system according to one embodiment of the invention; and, FIGS. 3(a), 3(b), and 3(c) show diagrams of user interfaces according to one embodiment of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, an overview of the invention is presented.

In the third section, a user interface in accordance with an embodiment of the invention is provided. Finally, in the fourth section, a conclusion of the detailed description is provided.

Hardware and Operating Environment

Figure 1:
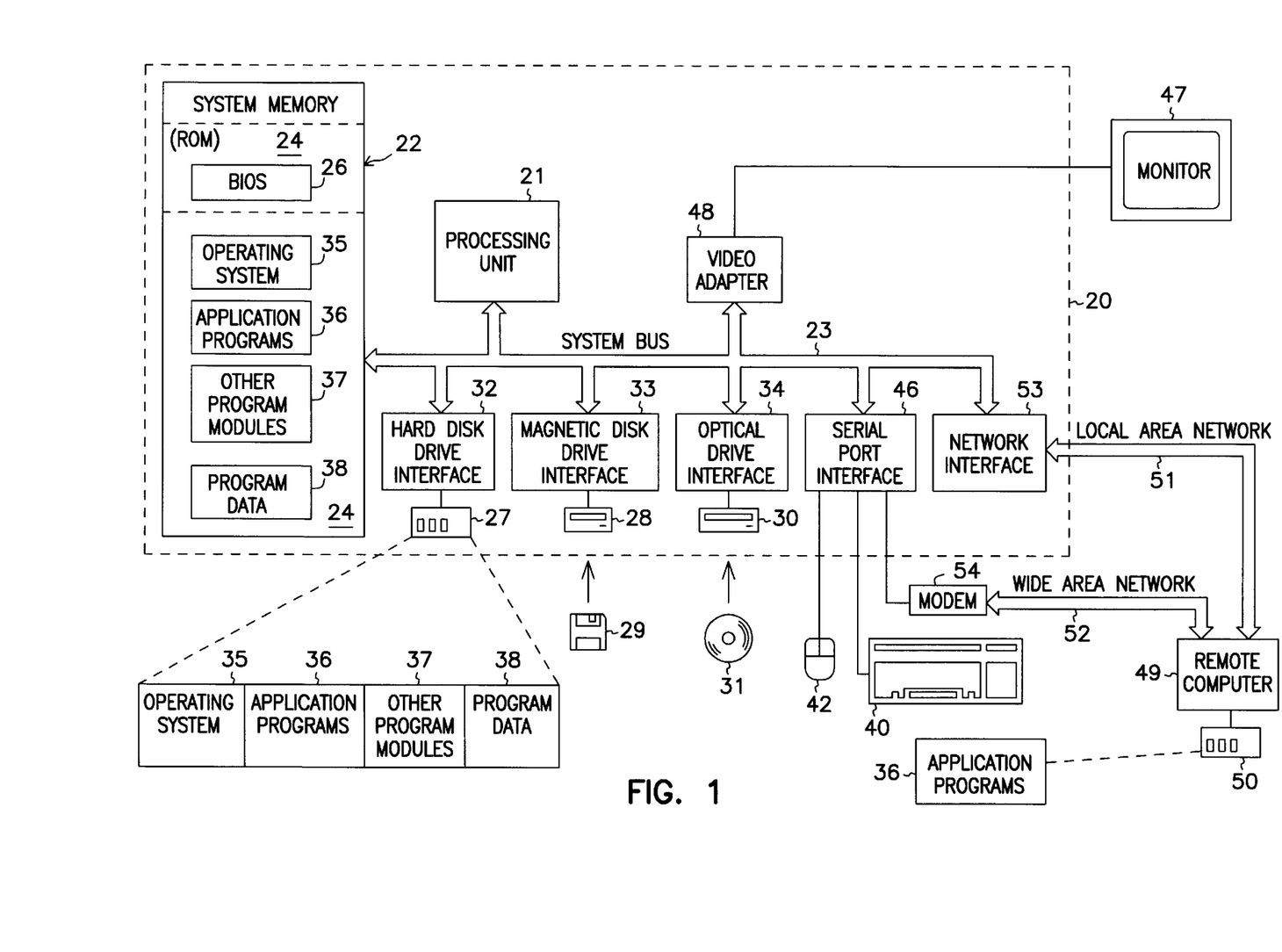
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer.

Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38.

A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1.

The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Overview of the Invention

Figure 2A:
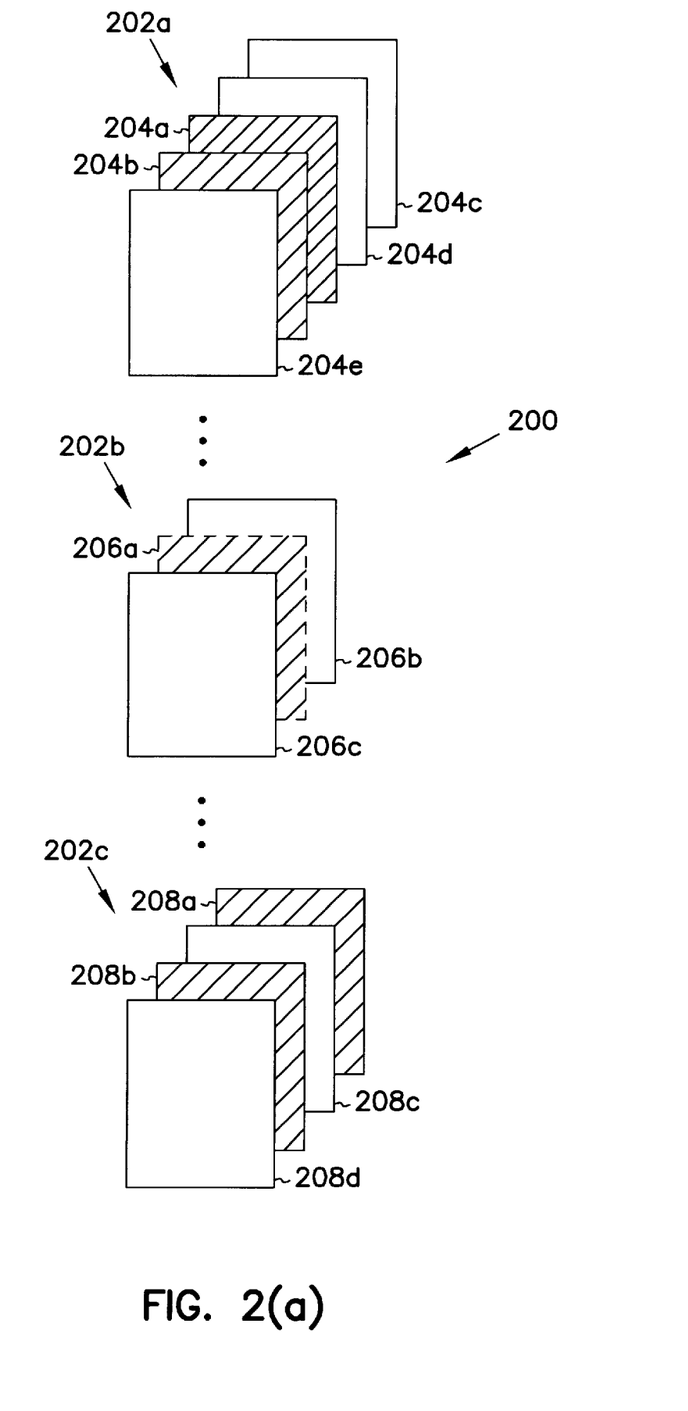
Figure 2B:
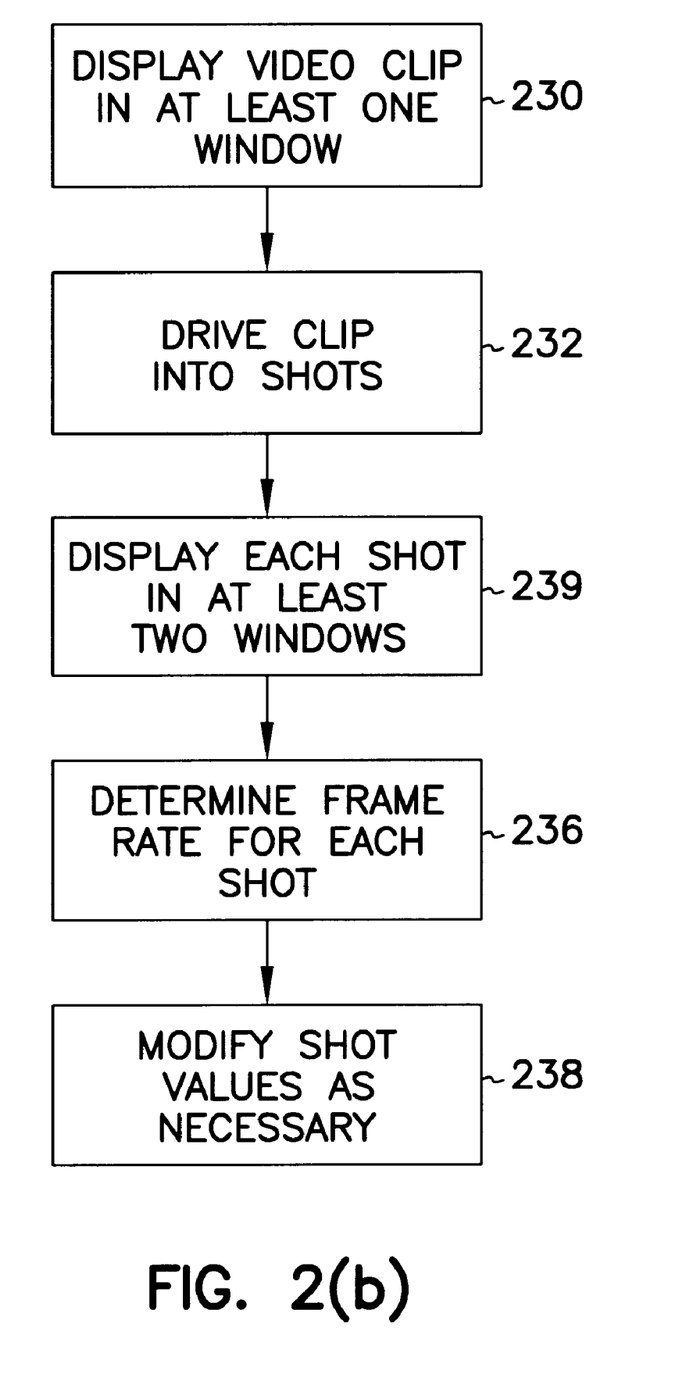
Figure 2C:
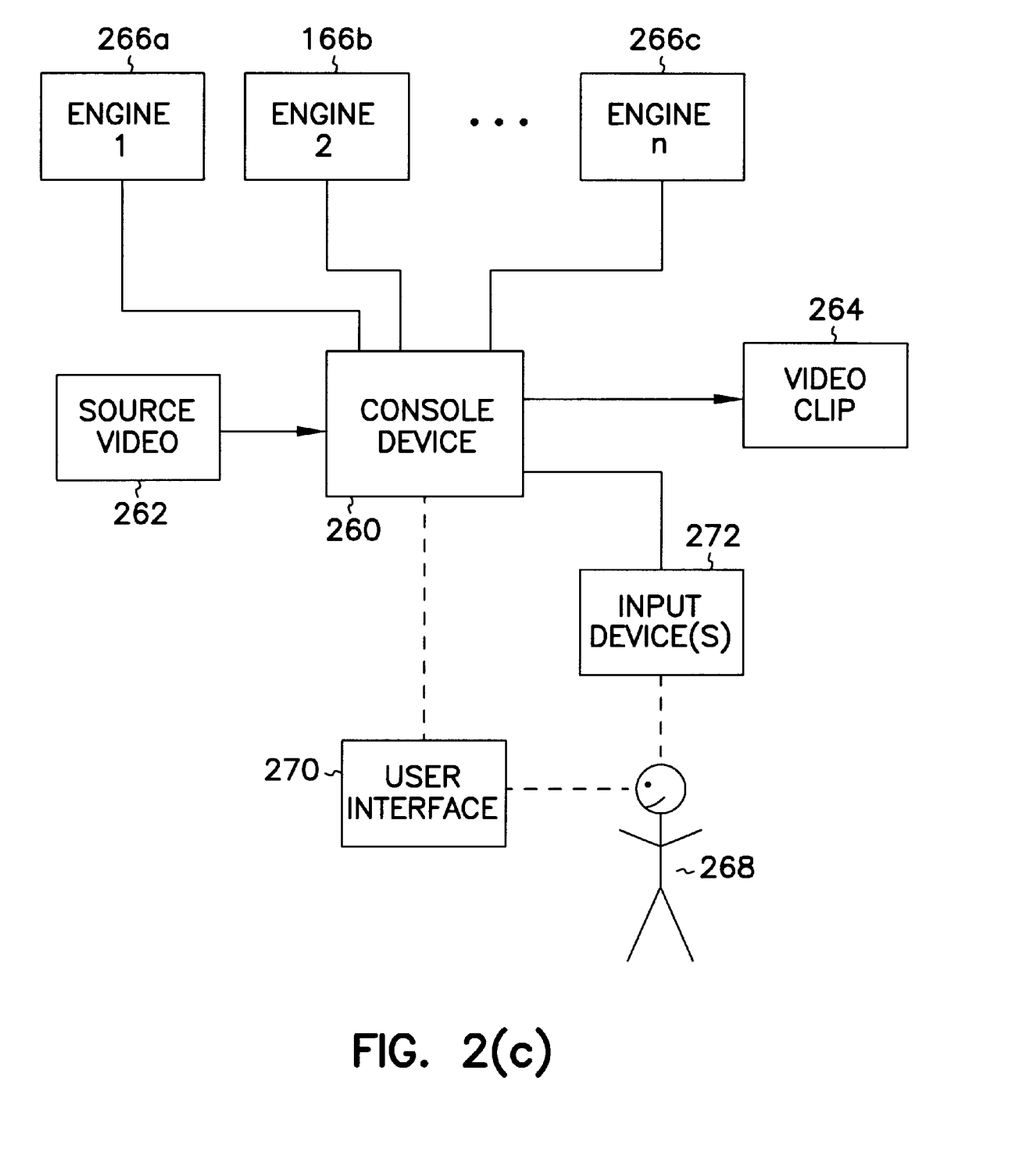

An overview of an exemplary embodiment of the invention is described by reference to FIGS. 2(a)–2(c). Specifically, FIG. 2(a) shows a representative video clip in conjunction with which the invention may be used. FIG. 2(b) shows a flowchart of a method according to an embodiment of the invention, while FIG. 2(c) shows a diagram of a system according to an embodiment of the invention.

Referring first to FIG. 2(a), a representative video clip in conjunction with which the invention may be used is shown. Video clip 200 is desirably digitally compressed, as decoded in accordance with a desired standard from a video source not shown in FIG. 2(a). For example, the video clip may be digitally compressed in accordance with the MPEG-1, MPEG-2 or MPEG-4 standard. The video source may be a film, television tuner, video tape, digital-video disk (DVD), or other video source, appropriately decoded as known within the art. The invention is not limited to a particular standard for digital compression, nor a particular format of video source.

Video clip 200 includes temporally sequential groups of pictures (GOP's), or shots, 202a, 202b and 202c. Those of ordinary skill within the art will appreciate that only three shots have been shown as constituting video clip 200 for purposes of illustrative clarity and simplicity. Generally, there will be more than three shots, and the invention is not particularly limited. Each shot 202a, 202b and 202c specifically includes a number of frames that are a part of video clip 200, as decoded from the video source, in accordance with a particular frame rate as desired. For example, shot 202a includes two frames 204a and 204b, as selected from a number of frames from the video source also including frames 204c, 204d and 204e. Only frames 204a and 204b actually a part of shot 202a as a result of a selected frame rate for shot 202a; frames 204c, 204d, and 204e, although part of the source video, are not part of shot 202a (and therefore not a part of clip 200). This is specifically shown in FIG. 2(a): frames 204a and 204b are shaded, whereas frames 204c, 204d and 204e are not.

The frames 204a and 204b that are a part of shot 202a were a part of the source video, as appropriately digitally processed. However, this is not required. For example, shot 202b includes frame 206a, which is a blending of actual shots 206b and 206c from the source video. This is also specifically shown in FIG. 2(a): frame 206a has a dotted-line border and is shaded, whereas frames 206b and 206c have a solid border and are not shaded. The blending may be accomplished in accordance with a desired standard, such as an MPEG standard. Finally, shot 202c includes two frames 208a and 208b, as selected from a number of frames of the source video also including frames 208b and 208d. This is shown in FIG. 2(a) as well: frames 208a and 208b are shaded, whereas frames 208c and 208d are not.

Those of ordinary skill within the art will appreciate that the video clip of FIG. 2(a) has been also simplified for illustrative purposes in that the number of frames making up each shot is unrealistically low. Each shot, for example, typically has a frame rate defined as a certain number of frames displayed in each second. Exemplary frame rates include ten, twenty, thirty, etc., frames per second.

Therefore, each shot typically will include hundreds of individual frames for a shot running any appreciable length. The shots of FIG. 2(a), conversely, are simplified, for illustrative clarity and simplicity.

Each shot 202a, 202b and 202c of video clip 200 has a frame rate that is optimally selected by a user, such as a video professional, to provide for optimal display of the video clip in light of buffer size and other constraints. For example, shot 202a may show a lot of motion, and therefore have a higher frame rate than 202b, which may show a more stationery scene, and therefore not require as high a frame rate. Furthermore, shot 202c may have a lesser frame rate than would be optimally desirable for viewing purposes, to prevent a buffer overrun or buffer underrun condition, as those of ordinary skill within the art can appreciate.

Referring next to FIG. 2(b), a flowchart of a method in accordance with an exemplary embodiment of the invention is shown. In step 230, a video clip, such as video clip 200 of FIG. 2(a), is displayed in at least one window within a graphical user interface of a computerized system (such as the computer as has been described in conjunction with FIG. 1). The displaying of the video clip permits the dividing of the clip into a number of shots, where each shot includes a number of frames, as has been described in conjunction with FIG. 2(a). Thus, in step 232, the clip is divided into shots. In one embodiment, this is accomplished by receipt of an input event by the system while the video clip is playing to signify boundaries between temporally adjacent shots. For example, every time the user presses a button on an input device, or presses a key on a computer keyboard, the end of the current shot is demarcated, and a new shot begins (where the beginning of the video clip denotes the beginning of the first shot, and the end of the clip denotes the end of the last shot).

Next, in step 234, each shot is displayed in at least two windows, again within a graphical user interface of a computerized system. The display of each shot in at least two windows permits the selecting of a desired frame rate for each shot. Thus, in step 236, for each shot a desired frame rate is selected. In one embodiment, this is accomplished by displaying a given shot in each window concurrently, but at a different frame rate. By initiating an appropriate input event, such as positioning a pointer of the user interface over the window corresponding to the desired frame rate and pressing a mouse button or a key on the keyboard (i.e., selecting the appropriate window), the user selects the desired frame rate.

Desirably, each shot is displayed within the at least two windows in an endless loop continuously until the user has selected the window corresponding to the desired frame rate for that shot. Once the user has selected the frame rate for one shot, the next shot is then displayed in the at least two windows in an endless loop continuously, until the user has selected the window corresponding to the desired frame rate for this shot. This process is repeated in steps 234 and 236 until the frame rates for all the shots have been selected by the user.

Thus, an advantage of the invention is that the user is able to easily select an optimal frame rate for each shot of the video clip. Because each window displays the shot over and over at a different frame rate, the user is able to see the difference in viewing quality over the different frame rates. The user thus may select, for example, the lowest frame rate that preserves a desired standard of viewing quality for a given shot. For stationery shots, for example, lower frame rates may still yield high quality viewing, while for high-motion shots, higher frame rates may be required to retain the desired standard of viewing quality.

The selection of a different frame rate for each shot within a video clip is advantageous in itself because it provides for a greater reduction in the total memory (file) size of the video clip as compared to other methods, while providing for a potentially higher video clip playback quality. For example, it has been found that selecting different frame rates for different shots within the context of an MPEG-1 compression standard provides for shorter file lengths than selecting the same frame rate for all the shots, also within the context of an MPEG-1 compression standard. For further example, it has been found that selecting different frame rates for different shots within the context of an MPEG-1 compression standard provides for shorter file lengths and better picture quality than the compression standard as provided by the QuickTime standard known within the art.

Finally, in step 238, individual shot values for each shot may be modified by the user as necessary. In one embodiment, where an MPEG standard for compression is utilized, the user may modify or tweak the Q value (corresponding generally to picture quality) and the bit rate (i.e., the frame rate) for any shot to compensate for potential buffer underrun or buffer overrun conditions (or other conditions; the invention is not so limited). While compression in accordance with the MPEG standard takes into account the size of buffer to be utilized, the user may nevertheless determine that one or more shots may be "cutting it close" in terms of overrunning or under running the buffer. Therefore, slightly tweaking the Q value, or slightly changing the bit rate, of a given shot, may be necessary to "play it safe."

Referring next to FIG. 2(*c*), a diagram of a computerized system in accordance with an embodiment of the invention is shown. Console device 260 receives source video 262 and manages the decoding of the source video into digitally compressed and processed video clip 264. Console device 260 in one embodiment comprises a computer having a processor and a computer-readable medium (such as random-access memory), such as the computer described in conjunction with FIG. 1. Specifically, the computer is desirably a computer having installed thereon a version of the Microsoft Windows operating systems, such as Microsoft Windows 95, Microsoft Windows 98, and Microsoft Windows NT.

Console device 260 utilizes video engines 266*a*, 266*b*, . . . , 266*n* as necessary, where these video engines perform the actual decoding of shots as is necessary under a given standard, such as an MPEG standard. Thus, the console device appropriately directs the video engines to process the frames of the shots of the video clip, where each video engine is capable of processing the frames of the shots of the video clip according to a desired standard. Each video engine 266*a*, 266*b*, . . . , 266*n* desirably includes a processor; each engine may thus be a separate processor card contained with a single computer, or each may be a computer itself.

Console device 260 directs video engines 266*a*, 266*b*, . . . , 266*n* to process the frames of the shots of the video clip as dictated by user 268. This is accomplished by the console device providing user interface 270, and receiving feedback regarding that which is displayed on interface 270 via one or more input devices 272. User interface 270 has multiple windows to permit user 268 to select a desired frame rate for each of the shots of the video clip via selection of one of the multiple windows through an input event initiated by the user at one of the input devices 272 (e.g., mouse, computer keyboard, touch pad, etc.; the invention is not so limited). Desirably, user interface 270 also has at least one window to permit dividing the clip into the different shots. The user interface is also desirably provided by a computer program running within an operating system installed on console device 260, the computer program desirably being able to be stored on a computer-readable medium such as a CD-ROM or a floppy disk.

Thus, the operation of the computerized system of FIG. 2(*c*) is as follows. Console device 260 receives source video 262 as an input, which is appropriately processed by video engines 266*a*, 266*b*, . . . , 266*n*. This source video 262 thus becomes digitally processed and compressed video clip 264. Console device 260 displays the video clip within at least one window within user interface 270, to permit the user to divide the video clip into separate shots. The user utilizes input device(s) 272 to initiate an input event to signify boundaries between temporally adjacent shots.

Console device 260 then displays each shot within at least two windows within user interface 270, where each window displays the shot at a different frame rate, desirably in an endless loop until the user has initiated an input event to select the window corresponding to the desired frame rate. This is accomplished for each shot of the video clip. Finally, as has been described in conjunction with FIG. 2(*b*), the user may modify shot values such as the Q value and bit rate value for each shot, again via user interface 270 and input device(s) 272, to tweak one or more individual shots. The result of this processing is the finalized video clip 264, which is the output of console device 260.

An overview of the invention has been provided. A representative video clip in conjunction with which embodiments of the invention may be used has been shown and described. Furthermore, an exemplary method and an exemplary system according to embodiments of the invention have been shown and described.

User Interface According to an Exemplary Embodiment

In the previous section, an overview of the operation of an exemplary embodiment of the invention was described. In this section, a user interface in conjunction with which the method and system of the previous section may be used is shown. The user interface is shown by reference to FIGS. 3(*a*)–3(*c*), each of which is a diagram of an exemplary screen of a user interface in accordance with one embodiment of the invention. Those of ordinary skill within the art can appreciate that the user interface as shown in FIGS. 3(a)–3(c) are exemplary of one embodiment of the invention, and the invention itself is not particularly limited to the user interface of FIGS. 3(a)–3(c).

Figure 3A:
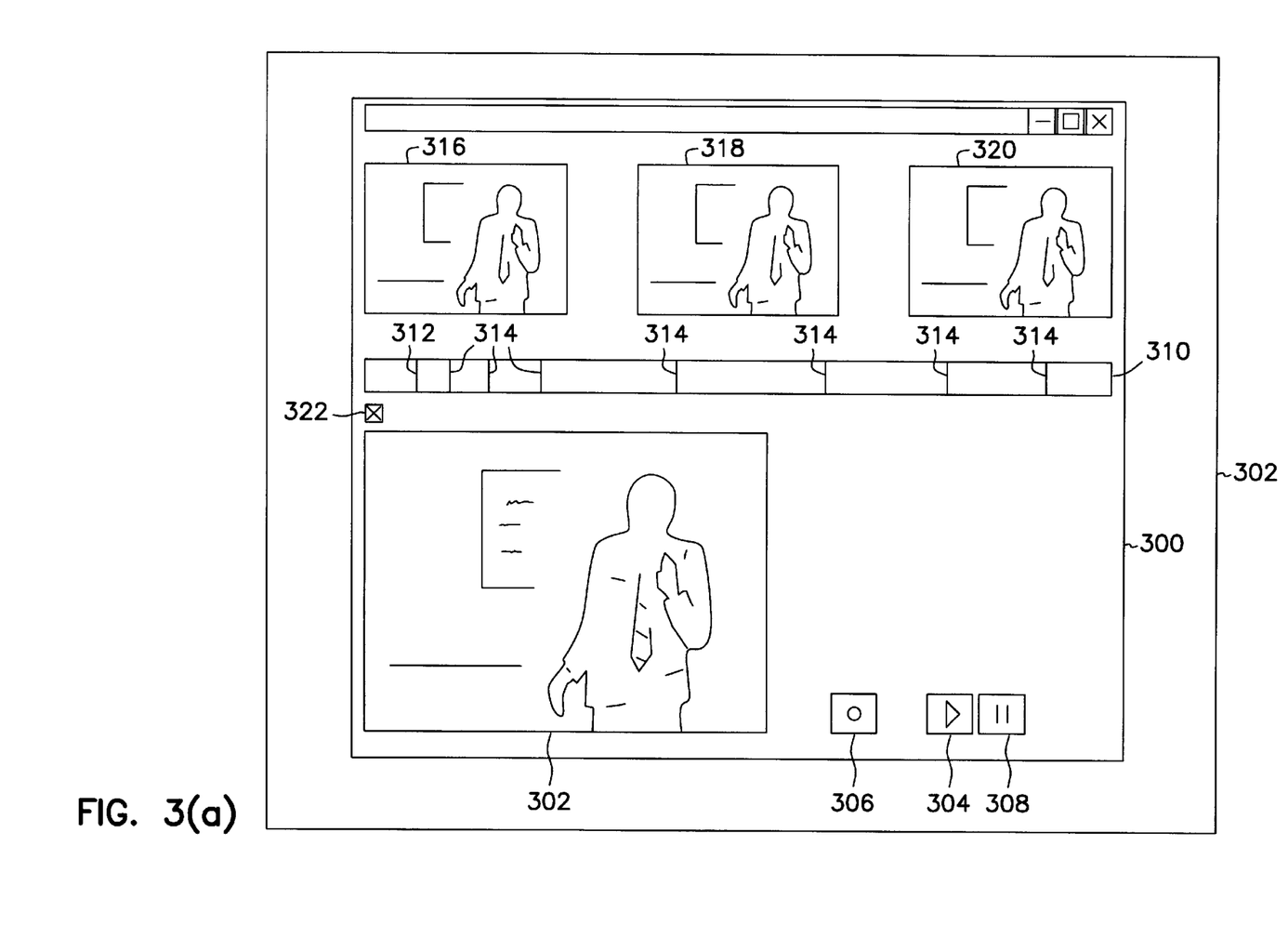
Figure 3B:
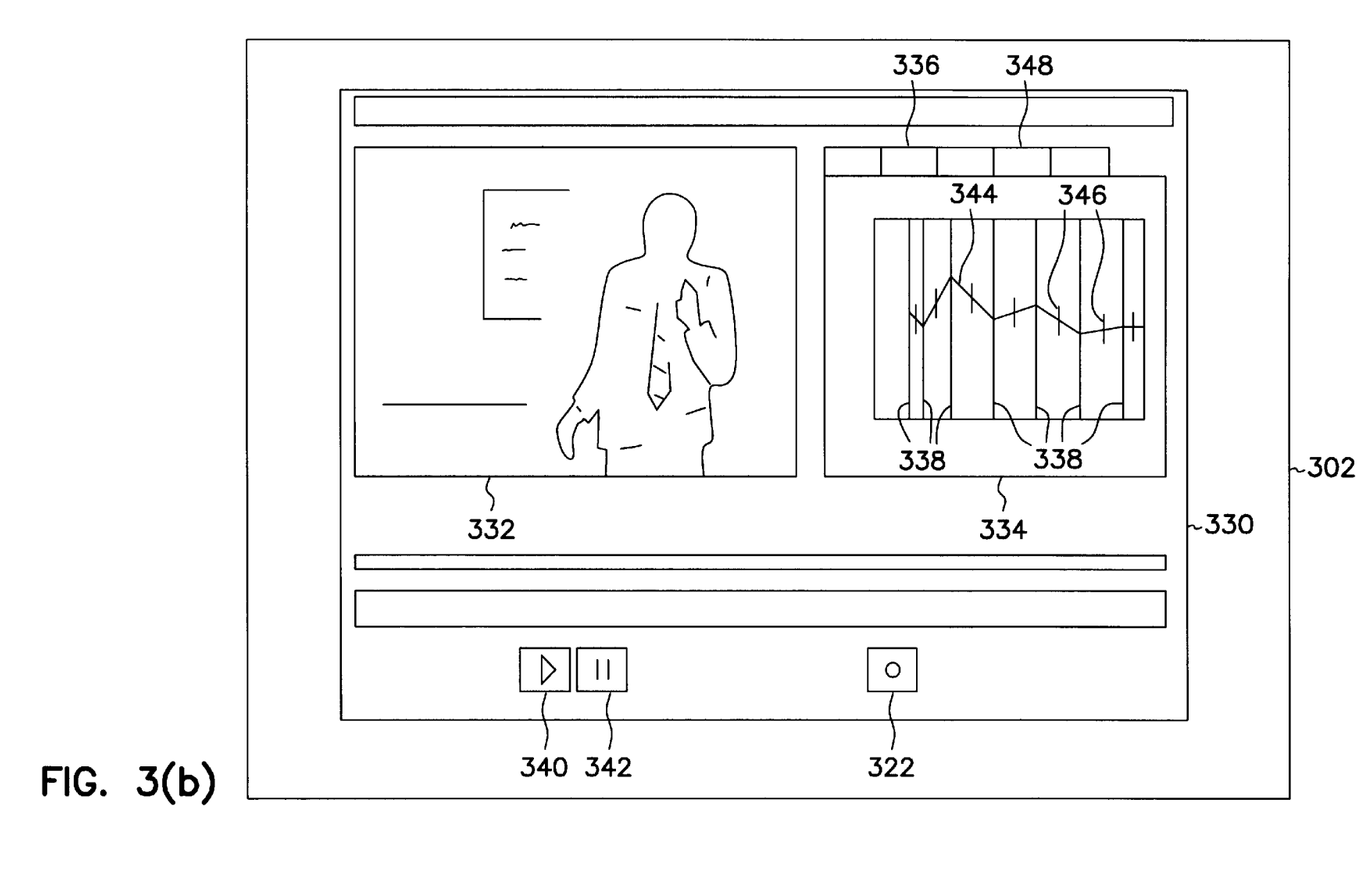
Figure 3C:
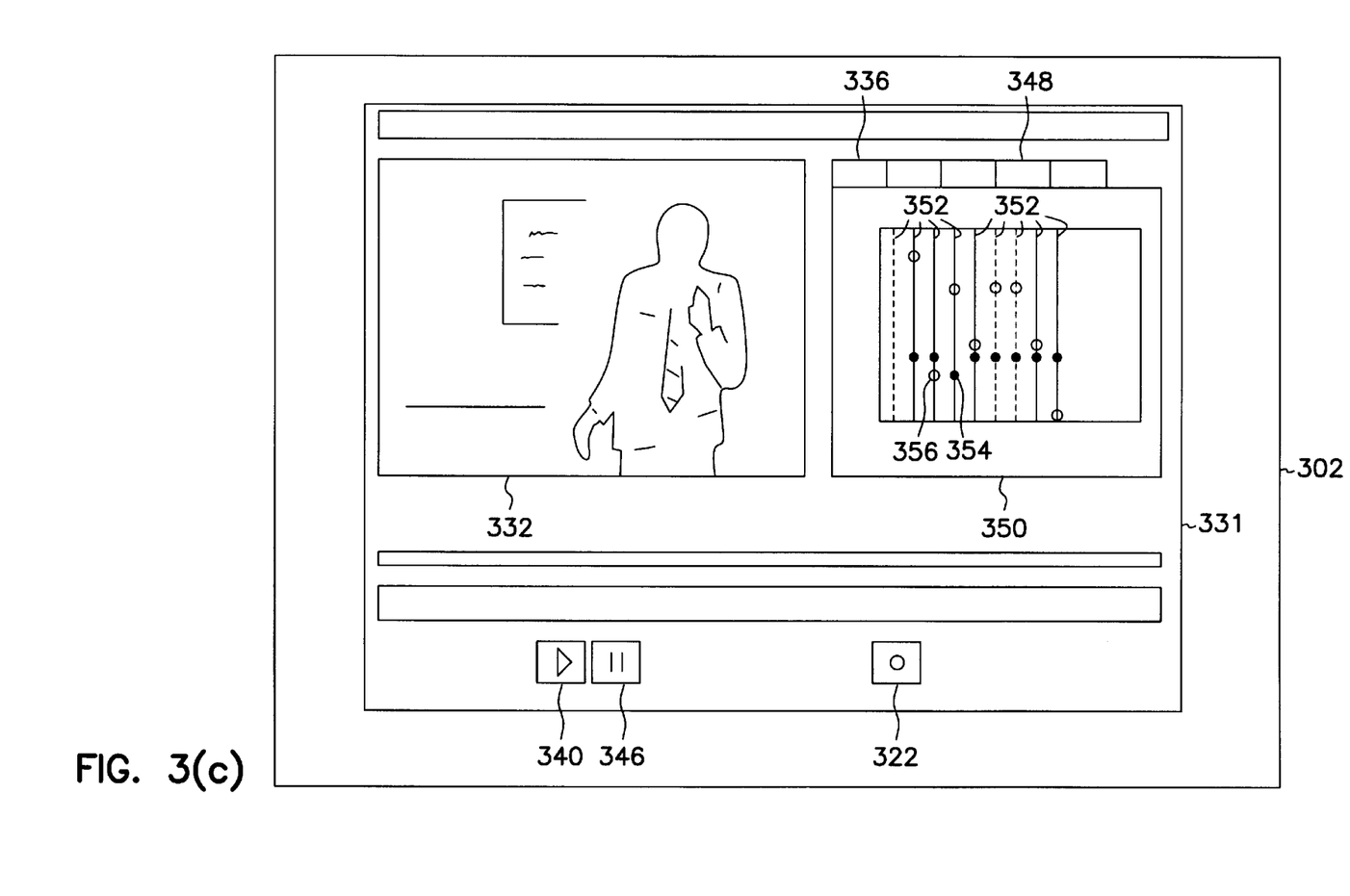

Referring first to FIG. 3(a), user interface screen 300 is shown displayed within monitor 302. User interface screen 300 desirably operates within an operating system, such as a version of the Microsoft Windows operating system. Desirably as well, user interface screen 300 is executed as a computer program on a computer, such as that as has been described in conjunction with FIG. 1.

User interface screen 300 includes window 302, within which a video clip is displayed. A user initiates playback of the video clip within window 302 by selecting play button 304, and may also stop or pause playback of the video clip by selecting stop button 306 or pause button 308, respectively. User interface screen 300 also includes graphical meter 310, which corresponds to the playback of the video clip within window 302. Thus, as the video clip is displayed within window 302, moving position indicator 312 moves from left to right within meter 312, where the left of meter 312 corresponds to the beginning of the video clip, and the right of meter 312 corresponds to the end of the video clip.

While the video clip is being displayed, the initiation of an input event by the user on an input device demarcates boundaries between temporally adjacent shots. As the user so demarcates these boundaries, hash marks 314 appear within meter 310, to denote the boundaries. Thus, each space on meter 310 defined by two consecutive hash marks 314, between the beginning of meter 310 and the first hash mark 314, and between the last hash mark 314 and the end of meter 310, indicates a shot within the video clip.

Therefore, the user is able to graphically view within user interface screen 300 the number of shots within the video clip.

User interface screen 300 further includes windows 316, 318 and 320. Each of these windows 316, 318 and 320 desirably displays the playback of the video clip at a different frame rate. During the playback of the video clip, selection of one of the windows 316, 318 and 320 (via initiation by the user of an input event on an input device) causes the frame rate corresponding to the selected window to be associated with the currently displayed shot.

In this manner, the user is able to associate a different frame rate with each shot of the video clip, so that the optimal frame rate is selected for each shot.

Furthermore, user interface screen 300 includes loop indicator 322, shown in FIG. 3(a) as a graphical check box.

When the check box is checked by the user, the currently displayed shot within windows 316, 318 and 320 is displayed in an endless loop. This enables the user to continually view a shot so that the desired frame rate is selected. The user may jump to the next or previous shot by initiating an input event on an input device, such as by pressing predetermined keys on a computer keyboard. In this way, the user is able to quickly jump from shot to shot of the video clip, and set the frame rate for the playback of each shot as desired. Therefore, user interface screen 300 of FIG. 3(a) permits a user to easily divide a video clip into temporally sequential shots, and also to select the frame rate for each shot.

As has been previously described, tweaking of shot values for individual shots may be necessary to, among other things, correct for potential buffer underrun and overrun conditions, as known within the art. In one embodiment of the invention, user interface screens are provided for such tweaking, as is shown by reference to FIG. 3(b) and FIG. 3(c). The user interface screens shown in FIG. 3(b) and FIG. 3(c) are a shot editor, and may be switched to from the user interface screen of FIG. 3(a) by initiating an appropriate input event. Referring to FIG. 3(b), user interface screen 330 is shown as displayed within monitor 302. User interface screen 330 includes window 332, within which a shot of a video clip is displayed. A user initiates continuous playback of the shot by selecting play button 340, and may pause playback by selecting pause button 342.

Furthermore, within area 334 of user interface screen 330, viewable by selecting tab 336, the individual shots of a video clip are shown as separated by lines 338. Thus, each space within area 336 defined by two consecutive lines 338, between the beginning of area 336 and the first line 338, and between the last line 338 and the end of area 338, indicates a shot within the video clip. Graph 344 is displayed within area 334, and indicates the fullness of the MPEG decoder playback buffer as known within the art, across each shot, in the embodiment of the invention where a version of the MPEG standard is used for decoding. Specifically, graph 344 is drawn in one embodiment by connecting the ending buffer fullness value of each shot across each successive shot to the ending buffer fullness value for that successive shot.

User interface screen 330 also include hash marks within each shot of area 334, such as hash mark 346, to represent the range of decoder buffer fullness values within the display of each shot. The hash marks are located on graph 344 to indicate buffer usage while the shot is being played back. Therefore, hash marks that have a beginning or an end that are close to graph 344 may indicate a potential overrun or underrun condition.

To tweak the playback of such shot, tab 348 is selected. Selection of tab 348 brings up the user interface screen shown in FIG. 3(c). Referring to FIG. 3(c), user interface 331 of FIG. 3(c) is identical to that of user interface screen 330 of FIG. 3(b), except that selection of tab 348 has brought up area 350 in lieu of area 334 shown in FIG. 3(b). Area 350 defines shots within a video clip via a series of lines 352, where each solid line 352 represents one shot, and each dotted line represents a part of a shot. On each line 352 is a ball and a circle, such as ball 354 and circle 356. The balls and circles are indicators corresponding to the Q value and the bit rate, respectively, for the shots, in an embodiment of the invention implemented in conjunction with a version of the MPEG compression and decoding standard.

Thus, dragging the ball for a shot up or down causes the Q value for the shot to increase or decrease, respectively, while dragging the circle for a shot up or down causes the bit rate for the shot to increase or decrease, respectively. Such directional dragging of these indicators permits a corresponding adjustment of the Q value and bit rate for each shot of the video clip. Therefore, insofar as the user detects a potential overrun or underrun condition, he or she is able to prevent such a condition from occurring by adjusting the Q value and the bit rate for individual shots within a given video clip.

A user interface for an exemplary embodiment of the invention has been shown and described. The user interface includes two parts: a first part in which the user is able to divide a video clip into shots and select a frame rate for each shot, and a second part in which the user is able to modify shot values (e.g., Q values and bit rates) for individual shots within a given video clip. Those of ordinary skill within the art will appreciate that other shot values, besides Q values and bit rates, are also amenable to modification by a user interface according to the invention.

Conclusion

An optimal frame rate selection user interface has been described. In particular the use of at least one window to divide a video clip into a series of shots, and the use of at least two windows to provide for selection of an optimal frame rate for each shot, have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized method comprising:
    a) displaying a video clip within at least one window to permit dividing the clip into a plurality of shots, each shot having a plurality of frames; and,
    b) displaying each shot within at least two windows to permit selecting a desired frame rate for each shot.

2. The computerized method of claim 1, further comprising between a) and b), c) dividing the clip into the plurality of shots.

3. The computerized method of claim 2, wherein c) includes receiving input events from a user to signify boundaries between temporally adjacent shots.

4. The computerized method of claim 3, wherein the input events are selected from the group of input events consisting of pressing a button on an input device and pressing a key on a computer keyboard.

5. The computerized method of claim 1, wherein a) includes displaying a graphical meter having a moving position indicator corresponding to the video clip.

6. The computerized method of claim 5, wherein the graphical meter further includes indicators denoting boundaries between temporally adjacent shots.

7. The computerized method of claim 1, further comprising after b), d) selecting the desired frame rate for each shot.

8. The computerized method of claim 7, wherein d) includes receiving for each shot an input event from a user to signify the desired frame rate for the shot.

9. The computerized method of claim 8, wherein each of the at least two windows within which a shot is displayed has a different frame rate.

10. The computerized method of claim 9, wherein the input event comprises selecting one of the at least two windows having the desired frame rate.

11. The computerized method of claim 1, further comprising after b), e) modifying at least one of a Q value and a bit rate for each of one or more shots within a video clip to compensate for one of a buffer underrun condition and a buffer overrun condition.

12. The computerized method of claim 11, wherein e) includes graphically displaying for each shot of the video clip a first indicator corresponding to the Q value of the shot, and a second indicator corresponding to the bit rate of the shot.

13. The computerized method of claim 12, wherein directionally dragging the first indicator for a shot causes a corresponding change in the Q value of the shot.

14. The computerized method of claim 12, wherein directionally dragging the second indicator for a shot causes a corresponding change in the bit rate of the shot.

15. A computerized system comprising:
    a plurality of video engines, each video engine capable of processing frames of shots of a video clip according to a desired standard;
    a console device to appropriately direct the plurality of video engines to process frames of shots of the video clip; and,
    a user interface provided by the console device and having multiple windows to permit a user to select a desired frame rate for each of the shots of the video clip via selection of one of the multiple windows.

16. The computerized system of claim 15, wherein each video engine includes at least a processor.

17. The computerized system of claim 15, wherein the desired standard comprises an MPEG standard.

18. The computerized system of claim 15, wherein the console device comprises a computer.

19. The computerized system of claim 15, wherein the user interface includes a loop indicator to toggle enablement of a loop mode wherein a given shot is continually displayed within the multiple windows while the user selects the desired frame rate for the given shot.

20. The computerized system of claim 19, wherein the loop indicator comprises a graphical check box.

21. The computerized system of claim 15, wherein the user interface further has at least one window to permit dividing the clip into the shots.

22. The computerized system of claim 21, wherein the user interface further has a graphical meter including a moving position indicator corresponding to the video clip.

23. The computerized system of claim 22, wherein the graphical meter also includes indicators denoting boundaries between temporally adjacent shots.

24. The computerized system of claim 15, wherein each of the multiple windows has a different frame rate.

25. The computerized system of claim 15, wherein the user interface further has a shot view including for each shot of a video clip a first indicator corresponding to a Q value for the shot and a second indicator corresponding to a bit rate for the shot.

26. The computerized system of claim 25, wherein directional dragging of the first indicator for a shot by the user causes a corresponding change in the Q value of the shot.

27. The computerized system of claim 25, wherein directional dragging of the second indicator for a shot by the user causes a corresponding change in the bit rate of the shot.

28. A computer comprising:
    a processor;
    a computer-readable medium; and,
    a computer program executed by the processor from the medium and providing a user interface to permit a user to select a desired frame rate for each of a plurality of shots of a video clip via selection of one of at least two windows.

29. The computer of claim 28, wherein the computer-readable medium comprises a memory.

30. The computer of claim 28, wherein the computer program is executed within an operating system.

31. The computer of claim 30, wherein the operating system comprises a version of the Microsoft Windows operating system.

32. The computer of claim 28, wherein the user interface includes a loop indicator to toggle enablement of a loop mode wherein a given shot is continually displayed within the at least two windows while the user selects the desired frame rate for the given shot.

33. The computer of claim 28, wherein the user interface further has at least one window to permit dividing the clip into shots.

34. The computer of claim 28, wherein the user interface further has a shot view including for each shot of a video clip a first indicator corresponding to a Q value for the shot and a second indicator corresponding to a bit rate for the shot.

35. A computer-readable medium having a computer program stored thereon for execution on a suitably equipped computer, the computer program providing a user interface to permit a user to select a desired frame rate for each of a plurality of shots of a video clip via selection of at least two windows.

36. The computer-readable medium of claim 35, wherein the computer-readable medium is selected from the group of mediums consisting of a floppy disk and a CD-ROM.

37. The computer-readable medium of claim 35, wherein the user interface includes a loop indicator to toggle enablement of a loop mode wherein a given shot is continually displayed within the at least two windows while the user selects the desired frame rate for the given shot.

38. The computer-readable medium of claim 35, wherein the user interface further has at least one window to permit dividing the clip into shots.

39. The computer-readable medium of claim 35, wherein the user interface further has a shot view including for each shot of a video clip a first indicator corresponding to a Q value for the shot and a second indicator corresponding to a bit rate for the shot.

40. A computer readable medium having instructions stored thereon for causing a computer system to execute a method comprising:

displaying a video clip within at least one window to permit dividing the clip into a plurality of shots, each shot having a plurality of frames; and, displaying each shot within at least two windows to permit selecting a desired frame rate for each shot.

41. A computer readable medium having instructions stored thereon for causing a computer system to execute a method comprising:

displaying a video clip within at least one window to permit dividing the clip into a plurality of shots, each shot having a plurality of frames;

displaying each shot within at least two windows to permit selecting a desired frame rate for each shot, wherein at least two of such windows have a different frame rate; and selecting the desired frame rate for each shot.

* * * * *